(12) United States Patent
Damera-Venkata et al.

(10) Patent No.: US 7,407,295 B2
(45) Date of Patent: *Aug. 5, 2008

(54) PROJECTION OF OVERLAPPING SUB-FRAMES ONTO A SURFACE USING LIGHT SOURCES WITH DIFFERENT SPECTRAL DISTRIBUTIONS

(76) Inventors: Niranjan Damera-Venkata, 1501 Page Mill Rd., Palo Alto, CA (US) 93404-1126; Nelson Liang An Chang, 1501 Page Mill Rd., Palo Alto, CA (US) 93404-1126; Simon Widdowson, 1501 Page Mill Rd., Palo Alto, CA (US) 93404-1126

(*) Notice: Subject to any disclaimer, the term of this patent is extended or adjusted under 35 U.S.C. 154(b) by 289 days.

This patent is subject to a terminal disclaimer.

(21) Appl. No.: 11/189,596

(22) Filed: Jul. 26, 2005

(65) Prior Publication Data

US 2007/0024824 A1    Feb. 1, 2007

(51) Int. Cl.
  *G02F 1/13357* (2006.01)
  *G03B 21/14* (2006.01)
(52) U.S. Cl. .............. 353/94; 353/85; 349/61; 348/798
(58) Field of Classification Search ......... 348/778–780, 348/800–803, 798; 353/94, 87, 34, 28, 48, 353/85; 349/8, 73, 74, 77, 78, 61
See application file for complete search history.

(56) References Cited

U.S. PATENT DOCUMENTS

| | | | |
|---|---|---|---|
| 4,373,784 A | 2/1983 | Nonomura et al. | |
| 4,662,746 A | 5/1987 | Hornbeck | |
| 4,811,003 A | 3/1989 | Strathman et al. | |
| 4,956,619 A | 9/1990 | Hornbeck | |
| 5,022,750 A * | 6/1991 | Flasck | 349/10 |
| 5,061,049 A | 10/1991 | Hornbeck | |
| 5,083,857 A | 1/1992 | Hornbeck | |
| 5,146,356 A | 9/1992 | Carlson | |
| 5,278,681 A * | 1/1994 | Gitlin et al. | 349/61 |
| 5,309,241 A | 5/1994 | Hoagland | |
| 5,317,409 A | 5/1994 | Macocs | |
| 5,386,253 A | 1/1995 | Fielding | |
| 5,402,009 A | 3/1995 | Kiyota | 327/176 |
| 5,402,184 A | 3/1995 | O'Grady et al. | |

(Continued)

FOREIGN PATENT DOCUMENTS

EP    1 001 306 A2    5/2000

OTHER PUBLICATIONS

C. Jaynes et al., "Super-Resolution Composition in Multi-Projector Displays," IEEE Int'l Workshop on Projector-Camera Systems, Oct. 2003; 8 pgs.

(Continued)

*Primary Examiner*—Andrew T Sever (57) ABSTRACT

A method of displaying an image with a display system includes receiving image data for the image. The method includes generating a first sub-frame and a second sub-frame corresponding to the image data. The method includes projecting the first sub-frame onto a target surface using a first projector light source. The method includes projecting the second sub-frame onto the target surface using a second projector light source, wherein the first and the second sub-frames at least partially overlap on the target surface, and wherein the first and the second light sources have substantially different spectral distributions.

28 Claims, 5 Drawing Sheets

U.S. PATENT DOCUMENTS

| | | | |
|---|---|---|---|
| 5,490,009 A | 2/1996 | Venkateswar et al. | |
| 5,557,353 A | 9/1996 | Stahl | |
| 5,689,283 A | 11/1997 | Shirochi | |
| 5,751,379 A | 5/1998 | Markandey et al. | |
| 5,842,762 A | 12/1998 | Clarke | |
| 5,897,191 A | 4/1999 | Clarke | |
| 5,912,773 A | 6/1999 | Barnett et al. | |
| 5,920,365 A | 7/1999 | Eriksson | |
| 5,978,518 A | 11/1999 | Oliyide et al. | |
| 6,025,951 A | 2/2000 | Swart et al. | |
| 6,067,143 A | 5/2000 | Tomita | |
| 6,104,375 A | 8/2000 | Lam | |
| 6,118,584 A | 9/2000 | Van Berkel et al. | |
| 6,141,039 A | 10/2000 | Poetsch | |
| 6,184,969 B1 | 2/2001 | Fergason | |
| 6,219,017 B1 | 4/2001 | Shimada et al. | |
| 6,239,783 B1 | 5/2001 | Hill et al. | |
| 6,243,055 B1 | 6/2001 | Fergason | |
| 6,313,864 B1 | 11/2001 | Tabata | 348/14.02 |
| 6,313,888 B1 | 11/2001 | Tabata | 348/790 |
| 6,317,171 B1 | 11/2001 | Dewald | |
| 6,384,816 B1 | 5/2002 | Tabata | |
| 6,384,876 B1* | 5/2002 | Sorensen | 348/829 |
| 6,390,050 B2 | 5/2002 | Feikus | |
| 6,393,145 B2 | 5/2002 | Betrisey et al. | |
| 6,522,356 B1 | 2/2003 | Watanabe | |
| 6,657,603 B1 | 12/2003 | Demetrescu et al. | |
| 2003/0020809 A1 | 1/2003 | Gibbon et al. | |
| 2003/0076325 A1 | 4/2003 | Thrasher | |
| 2003/0137610 A1* | 7/2003 | Ohsawa | 348/744 |
| 2004/0239885 A1 | 12/2004 | Jaynes et al. | |
| 2005/0275809 A1* | 12/2005 | Ikebe et al. | 353/52 |
| 2006/0209057 A1* | 9/2006 | Damera-Venkata et al. | 345/204 |
| 2006/0221304 A1* | 10/2006 | Damera-Venkata et al. | 353/30 |
| 2006/0250581 A1* | 11/2006 | Silverstein et al. | 353/20 |
| 2007/0052934 A1* | 3/2007 | Widdowson et al. | 353/94 |
| 2007/0091277 A1* | 4/2007 | Damera-Venkata et al. | 353/69 |
| 2007/0097334 A1* | 5/2007 | Damera-Venkata et al. | 353/94 |
| 2007/0132965 A1* | 6/2007 | Damera-Venkata et al. | 353/94 |

OTHER PUBLICATIONS

L.M. Chen & S. Hasagawa, "Visual Resolution Limits for Color Matrix Display—One Panel Projectors," vol. 13, pp. 221-226; 1992.

A. Yasuda et al., "FLC Wobbling for High-Resolution Projectors," Journal of the SID, pp. 229-305; May 1997.

T. Tokita et al., "P-108: FLC Resolution Enhancing Device for Projection Displays," pp. 229-305; SID 02 Digest 2002.

D.K. Kelley, "Motion and Vision—II. Stablilized Spatio-Temporal Threshold Surface," Journal of the Optical Society of America, vol. 69, No. 10; Oct. 1979.

Candice H. Brown Elliott et al., "Color Subpixel REndering Projectors and Flat Panel Displays," SMPTE Advanced Motion Imaging Conference; pp. 1-4; Feb. 27-Mar. 1, 2003.

Diana C. Chen, "Display Resolution Enhancement with Optical Scanners," Applied Optics, vol. 40, No. 5, pp. 636-643; Feb. 10, 2001.

E. Stupp et al., "Projection Displays," SID Series in Display Technology, Wiley; 1999; Section 12.3; pp. 280-285.

\* cited by examiner

PROJECTION OF OVERLAPPING SUB-FRAMES ONTO A SURFACE USING LIGHT SOURCES WITH DIFFERENT SPECTRAL DISTRIBUTIONS

CROSS-REFERENCE TO RELATED APPLICATION

This application is related to U.S. patent application Ser. No. 11/080,223, filed Mar. 15, 2005, and entitled PROJECTION OF OVERLAPPING SINGLE COLOR SUB-FRAMES ONTO A SURFACE and U.S. patent application Ser. No. 11/080,583, filed Mar. 15, 2005, and entitled PROJECTION OF OVERLAPPING SUB-FRAMES ONTO A SURFACE, both of which are hereby incorporated by reference herein.

BACKGROUND

Two types of projection display systems are digital light processor (DLP) systems, and liquid crystal display (LCD) systems. It is desirable in some projection applications to provide a high lumen level output, but it is very costly to provide such output levels in existing DLP and LCD projection systems. Three choices exist for applications where high lumen levels are desired: (1) high-output projectors; (2) tiled, low-output projectors; and (3) superimposed, low-output projectors.

When information requirements are modest, a single high-output projector is typically employed. This approach dominates digital cinema today, and the images typically have a nice appearance. High-output projectors have the lowest lumen value (i.e., lumens per dollar). The lumen value of high output projectors is less than half of that found in low-end projectors. If the high output projector fails, the screen goes black. Also, parts and service are available for high output projectors only via a specialized niche market.

Tiled projection can deliver very high resolution, but it is difficult to hide the seams separating tiles, and output is often reduced to produce uniform tiles. Tiled projection can deliver the most pixels of information. For applications where large pixel counts are desired, such as command and control, tiled projection is a common choice. Registration, color, and brightness must be carefully controlled in tiled projection. Matching color and brightness is accomplished by attenuating output, which costs lumens. If a single projector fails in a tiled projection system, the composite image is ruined.

Superimposed projection provides excellent fault tolerance and full brightness utilization, but resolution is typically compromised. Algorithms that seek to enhance resolution by offsetting multiple projection elements have been previously proposed. These methods assume simple shift offsets between projectors, use frequency domain analyses, and rely on heuristic methods to compute component sub-frames. The proposed systems do not generate optimal sub-frames in real-time, and do not take into account arbitrary relative geometric distortion between the component projectors, and do not project single-color sub-frames. Existing projection systems do not provide a cost effective solution for high lumen level (e.g., greater than about 10,000 lumens) applications.

Conventional projectors typically use a single light source and red, green, and blue light filters to produce multi-color images. In some conventional projectors, the red, green, and blue light filters are positioned on a color wheel. The color wheel is rotated to sequentially produce red, green, and blue (RGB) light. The red, green, and blue light is temporally multiplexed, so only one color is projected at a time. This temporal multiplexing can cause sequential color artifacts. In addition, a blanking period is typically provided between colors so that one color does not blend into the next, and light is wasted during these periods.

Single light source projection systems typically use a light source with a broad spectrum so that enough energy in RGB is obtained when used with RGB color wheels or color filters. The single light source systems with broad spectrum coverage are typically sub-optimal or expensive. Typically, Xenon lamps have such a broad spectral characteristic but are expensive and subject to explosions. Many ultra-high pressure (UHP) light sources, such as Metal-Halide lamps and Mercury arc lamps, also provide broad spectrum coverage, but have a "peaky response". Having to design lamps for broad spectrum makes them either too costly or significantly sub-optimal for a particular color.

Further, there may be regions in the lamp spectrum that fall between the responses of two color channels and that are wasted (filtered out by the RGB filters, and not used). The natural spikes in the lamp response are often wasted in order to preserve the purity of color primaries, or may be included in red, green, or blue, thereby producing "dirty colors". Multi-lamp systems have been used in the past, but these prior systems are not aimed at overall color and efficiency optimization, but instead target overall brightness gain.

SUMMARY

One form of the present invention provides a method of displaying an image with a display system. The method includes receiving image data for the image. The method includes generating a first sub-frame and a second sub-frame corresponding to the image data. The method includes projecting the first sub-frame onto a target surface using a first projector light source. The method includes projecting the second sub-frame onto the target surface using a second projector light source, wherein the first and the second sub-frames at least partially overlap on the target surface, and wherein the first and the second light sources have substantially different spectral distributions.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," etc., may be used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
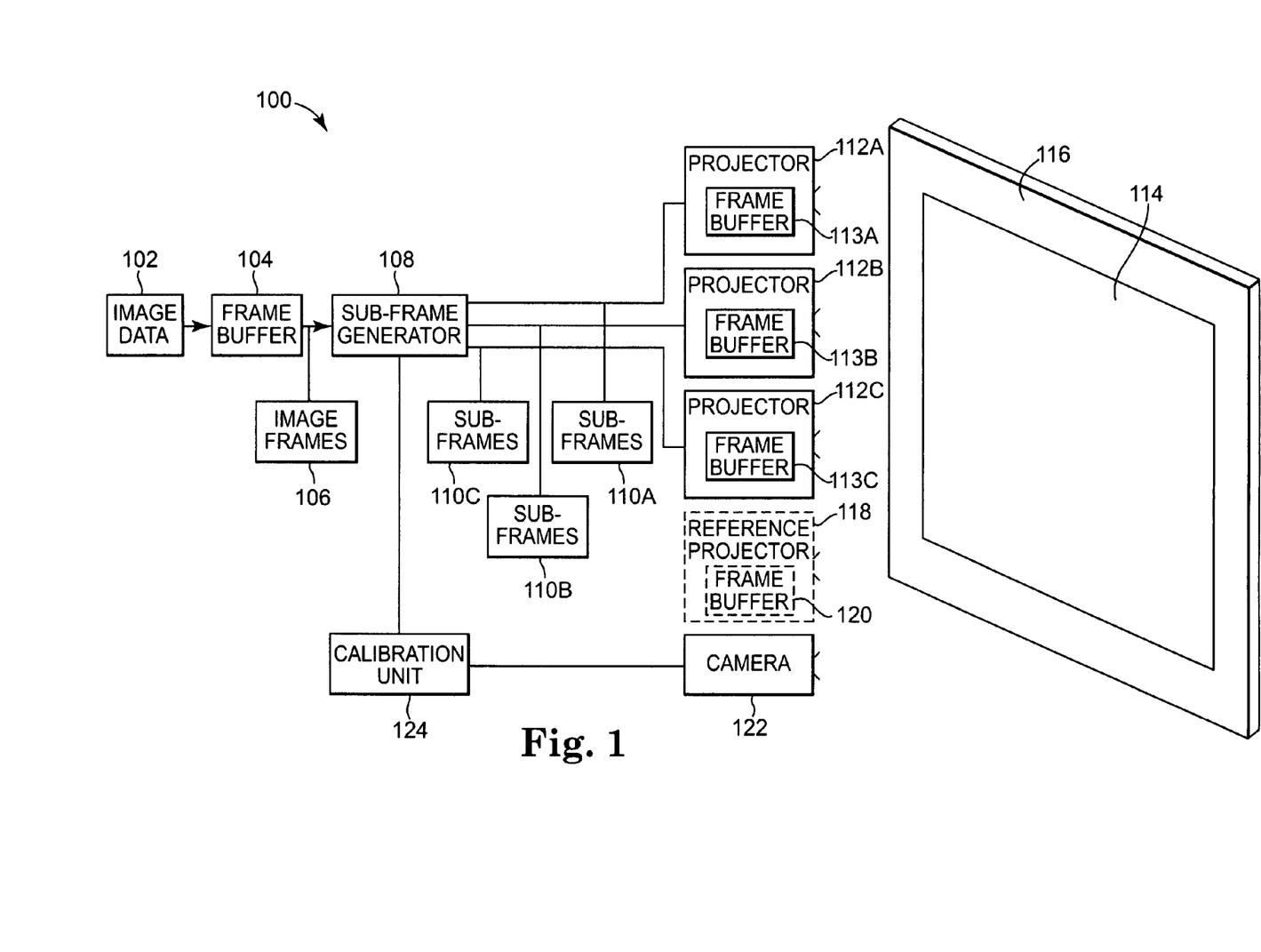
FIG. 1 is a block diagram illustrating an image display system according to one embodiment of the present invention.

FIG. 1 is a block diagram illustrating an image display system 100 according to one embodiment of the present invention. Image display system 100 processes image data 102 and generates a corresponding displayed image 114. Displayed image 114 is defined to include any pictorial, graphical, or textural characters, symbols, illustrations, or other representations of information.

In one embodiment, image display system 100 includes image frame buffer 104, sub-frame generator 108, projectors 112A-112C (collectively referred to as projectors 112), camera 122, and calibration unit 124. Image frame buffer 104 receives and buffers image data 102 to create image frames 106. Sub-frame generator 108 processes image frames 106 to define corresponding image sub-frames 110A-110C (collectively referred to as sub-frames 110). In one embodiment, for each image frame 106, sub-frame generator 108 generates one sub-frame 110A for projector 112A, one sub-frame 110B for projector 112B, and one sub-frame 110C for projector 112C. The sub-frames 110A-110C are received by projectors 112A-112C, respectively, and stored in image frame buffers 113A-113C (collectively referred to as image frame buffers 113), respectively. Projectors 112A-112C project the sub-frames 110A-110C, respectively, onto target surface 116 to produce displayed image 114 for viewing by a user. Surface 116 can be planar or curved, or have any other shape. In one form of the invention, surface 116 is translucent, and display system 100 is configured as a rear projection system.

Image frame buffer 104 includes memory for storing image data 102 for one or more image frames 106. Thus, image frame buffer 104 constitutes a database of one or more image frames 106. Image frame buffers 113 also include memory for storing sub-frames 110A-110C. Examples of image frame buffers 104 and 113 include non-volatile memory (e.g., a hard disk drive or other persistent storage device) and may include volatile memory (e.g., random access memory (RAM)).

Sub-frame generator 108 receives and processes image frames 106 to define a plurality of image sub-frames 110. Sub-frame generator 108 generates sub-frames 110 based on image data in image frames 106. In one embodiment, sub-frame generator 108 generates image sub-frames 110 with a resolution that matches the resolution of projectors 112, which is less than the resolution of image frames 106 in one embodiment. Sub-frames 110 each include a plurality of columns and a plurality of rows of individual pixels representing a subset of an image frame 106.

In one embodiment, sub-frames 110 are each single-color sub-frames. In one form of the invention, sub-frames 110A are red sub-frames, sub-frames 110B are green sub-frames, and sub-frames 110C are blue sub-frames. In other embodiments, different colors may be used, and additional projectors 112 may be used to provide additional colors. In one form of the invention embodiment, each projector 112 projects single-color sub-frames 110 that are different in color than the color of the sub-frames 110 projected by the other projectors 112. In one embodiment, each projector 112 includes a color filter to generate the single color for each sub-frame 110 projected by that projector 112.

Projectors 112A-112C receive image sub-frames 110A-110C from sub-frame generator 108 and, in one embodiment, simultaneously project the image sub-frames 110 onto target 116 at overlapping and spatially offset positions to produce displayed image 114. In one embodiment, display system 100 is configured to give the appearance to the human eye of high-resolution displayed images 114 by displaying overlapping and spatially shifted lower-resolution sub-frames 110 from multiple projectors 112. In one form of the invention, the projection of overlapping and spatially shifted sub-frames 110 gives the appearance of enhanced resolution (i.e., higher resolution than the sub-frames 110 themselves).

A problem of sub-frame generation, which is addressed by embodiments of the present invention, is to determine appropriate values for the sub-frames 110 so that the displayed image 114 produced by the projected sub-frames 110 is close in appearance to how the high-resolution image (e.g., image frame 106) from which the sub-frames 110 were derived would appear if displayed directly. Naïve overlapped projection of different colored sub-frames 110 by different projectors 112 can lead to significant color artifacts at the edges due to misregistration among the colors. A problem solved by one embodiment of the invention is to determine the single-color sub-frames 110 to be projected by each projector 112 so that the visibility of color artifacts is minimized.

It will be understood by a person of ordinary skill in the art that functions performed by sub-frame generator 108 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory, and random access memory.

Also shown in FIG. 1 is reference projector 118 with an image frame buffer 120. Reference projector 118 is shown with hidden lines in FIG. 1 because, in one embodiment, projector 118 is not an actual projector, but rather is a hypothetical high-resolution reference projector that is used in an image formation model for generating optimal sub-frames 110, as described in further detail below with reference to FIGS. 2A-2C and 3. In one embodiment, the location of one of the actual projectors 112 is defined to be the location of the reference projector 118.

In one embodiment, display system 100 includes a camera 122 and a calibration unit 124, which are used in one form of the invention to automatically determine a geometric mapping between each projector 112 and the reference projector 118, as described in further detail below with reference to FIGS. 2A-2C and 3.

In one form of the invention, image display system 100 includes hardware, software, firmware, or a combination of these. In one embodiment, one or more components of image display system 100 are included in a computer, computer server, or other microprocessor-based system capable of performing a sequence of logic operations. In addition, processing can be distributed throughout the system with individual portions being implemented in separate system components, such as in a networked or multiple computing unit environment.

Figure 2A:
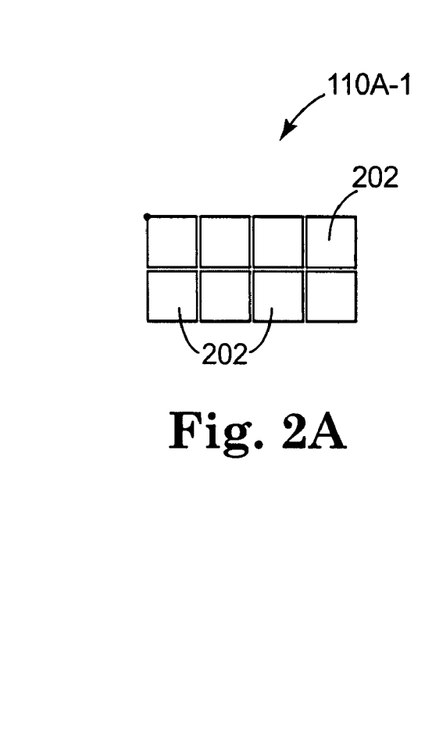
FIGS. 2A-2C are schematic diagrams illustrating the projection of two sub-frames according to one embodiment of the present invention.
Figure 2B:
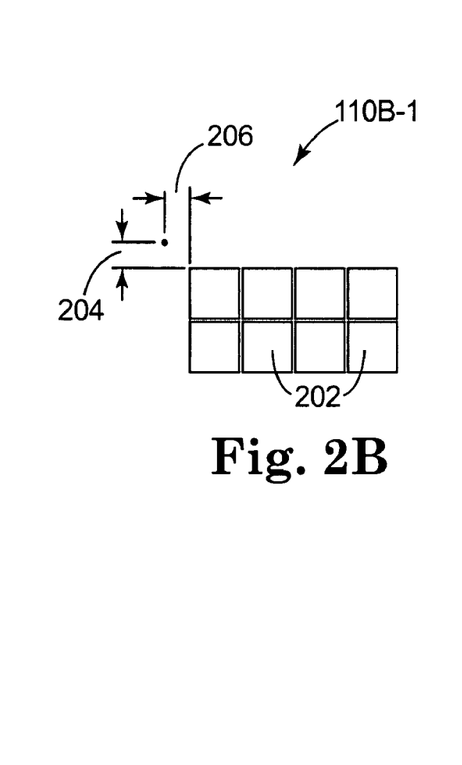
Figure 2C:
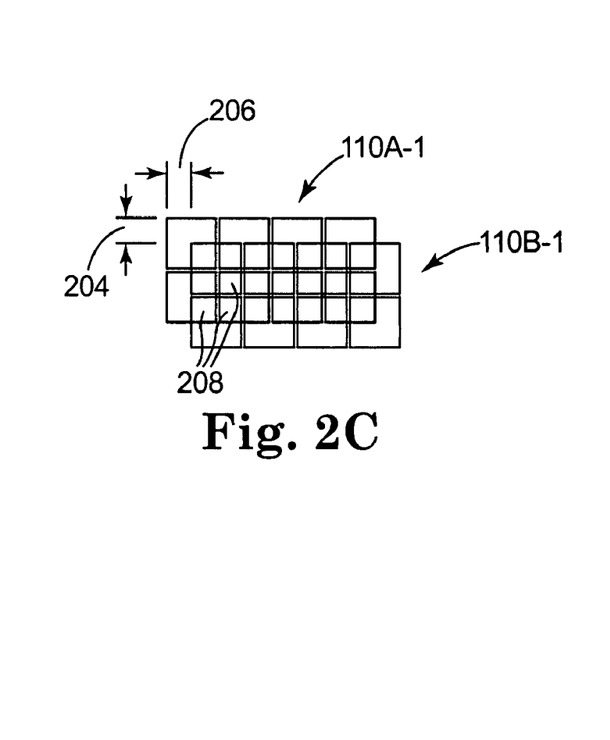

In one embodiment, display system 100 uses two projectors 112. FIGS. 2A-2C are schematic diagrams illustrating the projection of two sub-frames 110 according to one embodiment of the present invention. As illustrated in FIGS. 2A and 2B, sub-frame generator 108 defines two image sub-frames 110 for each of the image frames 106. More specifically, sub-frame generator 108 defines a first sub-frame 110A-1 and a second sub-frame 110B-1 for an image frame 106. As such, first sub-frame 110A-1 and second sub-frame 110B-1 each include a plurality of columns and a plurality of rows of individual pixels 202 of image data.

In one embodiment, as illustrated in FIG. 2B, when projected onto target 116, second sub-frame 110B-1 is offset from first sub-frame 110A-1 by a vertical distance 204 and a horizontal distance 206. As such, second sub-frame 110B-1 is spatially offset from first sub-frame 110A-1 by a predetermined distance. In one illustrative embodiment, vertical distance 204 and horizontal distance 206 are each approximately one-half of one pixel.

As illustrated in FIG. 2C, a first one of the projectors 112A projects first sub-frame 110A-1 in a first position and a second one of the projectors 112B simultaneously projects second sub-frame 110B-1 in a second position, spatially offset from the first position. More specifically, the display of second sub-frame 110B-1 is spatially shifted relative to the display of first sub-frame 110A-1 by vertical distance 204 and horizontal distance 206. As such, pixels of first sub-frame 110A-1 overlap pixels of second sub-frame 110B-1, thereby producing the appearance of higher resolution pixels 208. The overlapped sub-frames 110A-1 and 110B-1 also produce a brighter overall image 114 than either of the sub-frames 110 alone. In other embodiments, more than two projectors 112 are used in system 100, and more than two sub-frames 110 are defined for each image frame 106, which results in a further increase in the resolution, brightness, and color of the displayed image 114.

In one form of the invention, sub-frames 110 have a lower resolution than image frames 106. Thus, sub-frames 110 are also referred to herein as low- resolution images or sub-frames 110, and image frames 106 are also referred to herein as high-resolution images or frames 106. It will be understood by persons of ordinary skill in the art that the terms low resolution and high resolution are used herein in a comparative fashion, and are not limited to any particular minimum or maximum number of pixels.

In one form of the invention, display system 100 produces a superimposed projected output that takes advantage of natural pixel mis-registration to provide a displayed image 114 with a higher resolution than the individual sub-frames 110. In one embodiment, image formation due to multiple overlapped projectors 112 is modeled using a signal processing model. Optimal sub-frames 110 for each of the component projectors 112 are estimated by sub-frame generator 108 based on the model, such that the resulting image predicted by the signal processing model is as close as possible to the desired high-resolution image to be projected. In one embodiment, the signal processing model is used to derive values for the sub-frames 110 that minimize visual color artifacts that can occur due to offset projection of single-color sub-frames 110.

In one embodiment, sub-frame generator 108 is configured to generate sub-frames 110 based on the maximization of a probability that, given a desired high resolution image, a simulated high-resolution image that is a function of the sub-frame values, is the same as the given, desired high-resolution image. If the generated sub-frames 110 are optimal, the simulated high-resolution image will be as close as possible to the desired high-resolution image.

One form of the present invention determines and generates single-color sub-frames 110 for each projector 112 that minimize color aliasing due to offset projection. This process may be thought of as inverse de-mosaicking. A de-mosaicking process seeks to synthesize a high-resolution, full color image free of color aliasing given color samples taken at relative offsets. One form of the present invention essentially performs the inverse of this process and determines the colorant values to be projected at relative offsets, given a full color high-resolution image 106. The generation of optimal sub-frames 110 based on a simulated high-resolution image and a desired high-resolution image is described in further detail below with reference to FIG. 3.

Figure 3:
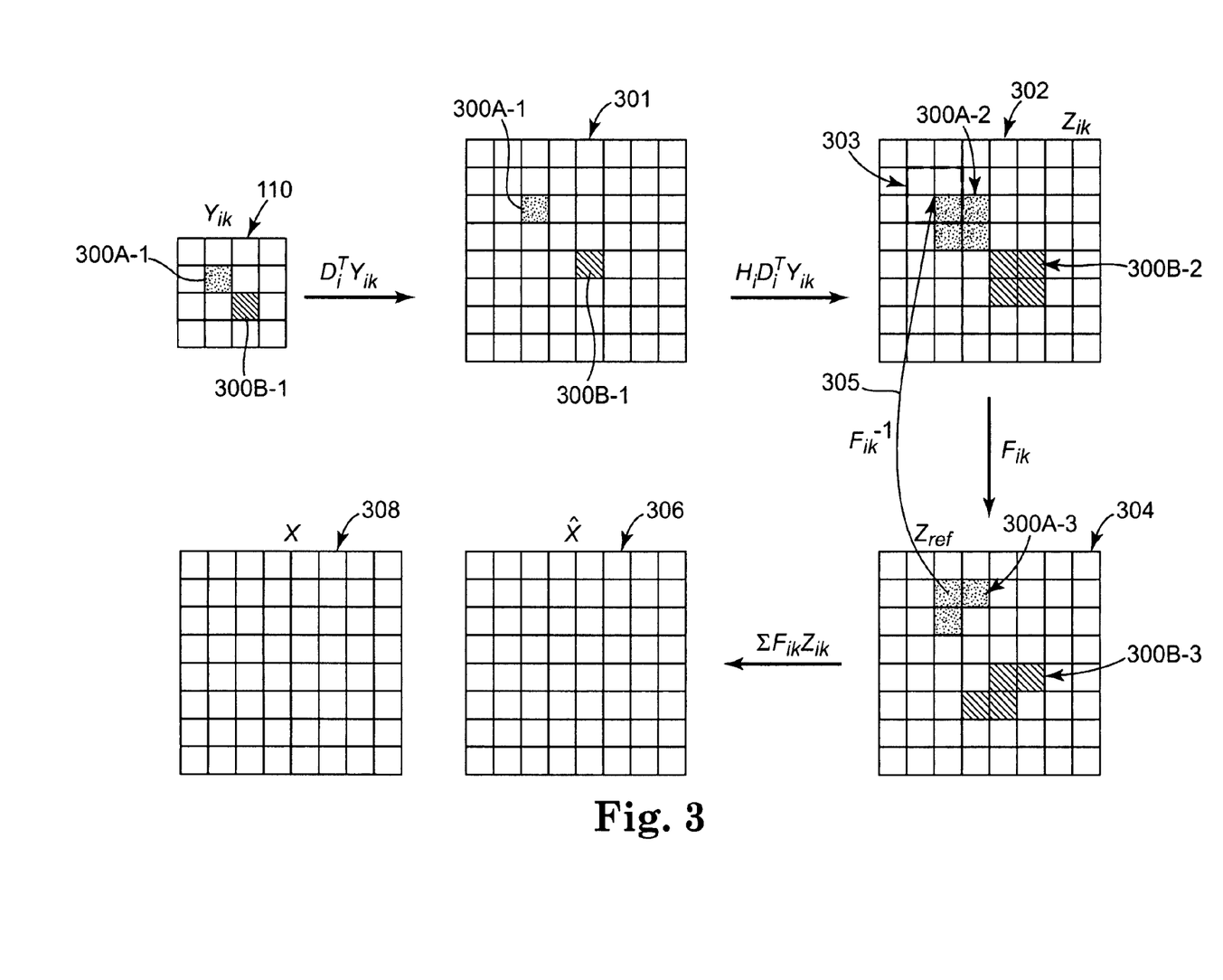
FIG. 3 is a diagram illustrating a model of an image formation process according to one embodiment of the present invention.

FIG. 3 is a diagram illustrating a model of an image formation process according to one embodiment of the present invention. The sub-frames 110 are represented in the model by $Y_{ik}$, where "k" is an index for identifying individual sub-frames 110, and "i" is an index for identifying color planes. Two of the sixteen pixels of the sub-frame 110 shown in FIG. 3 are highlighted, and identified by reference numbers 300A-1 and 300B-1. The sub-frames 110 ($Y_{ik}$) are represented on a hypothetical high-resolution grid by up-sampling (represented by $D_i^T$) to create up-sampled image 301. The up-sampled image 301 is filtered with an interpolating filter (represented by $H_i$) to create a high-resolution image 302 ($Z_{ik}$) with "chunky pixels". This relationship is expressed in the following Equation I:

$$Z_{ik} = H_i D_i^T Y_{ik} \qquad \text{Equation I}$$

where:
  k=index for identifying individual sub-frames 110;
  i=index for identifying color planes;
  $Z_{ik}$=kth low-resolution sub-frame 110 in the ith color plane on a hypothetical high-resolution grid;
  $H_i$=Interpolating filter for low-resolution sub-frames 110 in the ith color plane;
  $D_i^T$=up-sampling matrix for sub-frames 110 in the ith color plane; and
  $Y_{ik}$=kth low-resolution sub-frame 110 in the ith color plane.

The low-resolution sub-frame pixel data ($Y_{ik}$) is expanded with the up-sampling matrix ($D_i^T$) so that the sub-frames 110 ($Y_{ik}$) can be represented on a high-resolution grid. The interpolating filter ($H_i$) fills in the missing pixel data produced by up-sampling. In the embodiment shown in FIG. 3, pixel 300A-1 from the original sub-frame 110 ($Y_{ik}$) corresponds to four pixels 300A-2 in the high-resolution image 302 ($Z_{ik}$), and pixel 300B-1 from the original sub-frame 110 ($Y_{ik}$) corresponds to four pixels 300B-2 in the high-resolution image 302 ($Z_{ik}$). The resulting image 302 ($Z_{ik}$) in Equation I models the output of the projectors 112 if there was no relative distortion or noise in the projection process. Relative geometric distortion between the projected component sub-frames 110 results due to the different optical paths and locations of the component projectors 112. A geometric transformation is modeled with the operator, $F_{ik}$, which maps coordinates in the frame buffer 113 of a projector 112 to the frame buffer 120 of the reference projector 118 (FIG. 1) with sub-pixel accuracy, to generate a warped image 304 ($Z_{ref}$). In one form of the invention, the transformation, $F_{ik}$, is a coordinate mapping such as a translational shift, affine transformation, projective warp, or a more general non-linear transformation.

In one embodiment, $F_{ik}$ is linear with respect to pixel intensities, but is non-linear with respect to the coordinate transformations. As shown in FIG. 3, the four pixels 300A-2 in image 302 are mapped to the three pixels 300A-3 in image 304, and the four pixels 300B-2 in image 302 are mapped to the four pixels 300B-3 in image 304.

In one embodiment, the geometric mapping ($F_{ik}$) is a floating-point mapping, but the destinations in the mapping are on an integer grid in image 304. Thus, it is possible for multiple pixels in image 302 to be mapped to the same pixel location in image 304, resulting in missing pixels in image 304. To avoid this situation, in one form of the present invention, during the forward mapping ($F_{ik}$), the inverse mapping ($F_{ik}^{-1}$) is also utilized as indicated at 305 in FIG. 3. Each destination pixel in image 304 is back projected (i.e., $F_{ik}^{-1}$) to find the corresponding location in image 302. For the embodiment shown in FIG. 3, the location in image 302 corresponding to the upper-left pixel of the pixels 300A-3 in image 304 is the location at the upper-left corner of the group of pixels 300A-2. In one form of the invention, the values for the pixels neighboring the identified location in image 302 are combined (e.g., averaged) to form the value for the corresponding pixel in image 304. Thus, for the example shown in FIG. 3, the value for the upper-left pixel in the group of pixels 300A-3 in image 304 is determined by averaging the values for the four pixels within the frame 303 in image 302.

In another embodiment of the invention, the forward geometric mapping or warp ($F_k$) is implemented directly, and the inverse mapping ($F_k^{-1}$) is not used. In one form of this embodiment, a scatter operation is performed to eliminate missing pixels. That is, when a pixel in image 302 is mapped to a floating point location in image 304, some of the image data for the pixel is essentially scattered to multiple pixels neighboring the floating point location in image 304. Thus, each pixel in image 304 may receive contributions from multiple pixels in image 302, and each pixel in image 304 is normalized based on the number of contributions it receives.

A superposition/summation of such warped images 304 from all of the component projectors 112 in a given color plane forms a hypothetical or simulated high-resolution image (X-hat$_i$) for that color plane in the reference projector frame buffer 120, as represented in the following Equation II:

$$\hat{X}_i = \sum_k F_{ik} Z_{ik} \qquad \text{Equation II}$$

where:
   k=index for identifying individual sub-frames 110;
   i=index for identifying color planes;
   X-hat$_i$=hypothetical or simulated high-resolution image for the ith color plane in the reference projector frame buffer 120;
   $F_{ik}$=operator that maps the kth low-resolution sub-frame 110 in the ith color plane on a hypothetical high-resolution grid to the reference projector frame buffer 120; and
   $Z_{ik}$=kth low-resolution sub-frame 110 in the ith color plane on a hypothetical high-resolution grid, as defined in Equation I.

A hypothetical or simulated image 306 (X-hat) is represented by the following Equation III:

$$\hat{X} = [\hat{X}_1 \hat{X}_2 \dots \hat{X}_N]^T \qquad \text{Equation III}$$

where:
   X-hat=hypothetical or simulated high-resolution image in the reference projector frame buffer 120;
   X-hat$_1$=hypothetical or simulated high-resolution image for the first color plane in the reference projector frame buffer 120, as defined in Equation II;
   X-hat$_2$=hypothetical or simulated high-resolution image for the second color plane in the reference projector frame buffer 120, as defined in Equation II;
   X-hat$_N$=hypothetical or simulated high-resolution image for the Nth color plane in the reference projector frame buffer 120, as defined in Equation II; and
   N=number of color planes.

If the simulated high-resolution image 306 (X-hat) in the reference projector frame buffer 120 is identical to a given (desired) high-resolution image 308 (X), the system of component low-resolution projectors 112 would be equivalent to a hypothetical high-resolution projector placed at the same location as the reference projector 118 and sharing its optical path. In one embodiment, the desired high-resolution images 308 are the high-resolution image frames 106 (FIG. 1) received by sub-frame generator 108.

In one embodiment, the deviation of the simulated high-resolution image 306 (X-hat) from the desired high-resolution image 308 (X) is modeled as shown in the following Equation IV:

$$X = \hat{X} + \eta \qquad \text{Equation IV}$$

where:
   X=desired high-resolution frame 308;
   X-hat=hypothetical or simulated high-resolution frame 306 in the reference projector frame buffer 120; and
   $\eta$=error or noise term.

As shown in Equation IV, the desired high-resolution image 308 (X) is defined as the simulated high-resolution image 306 (X-hat) plus $\eta$, which in one embodiment represents zero mean white Gaussian noise.

The solution for the optimal sub-frame data ($Y_{ik}^*$) for the sub-frames 110 is formulated as the optimization given in the following Equation V:

$$Y_{ik}^* = \underset{Y_{ik}}{\mathrm{argmax}} P(\hat{X}|X) \qquad \text{Equation V}$$

where:
   k=index for identifying individual sub-frames 110;
   i=index for identifying color planes;
   $Y_{ik}^*$=optimum low-resolution sub-frame data for the kth sub-frame 110 in the ith color plane;
   $Y_{ik}$=kth low-resolution sub-frame 110 in the ith color plane;
   X-hat=hypothetical or simulated high-resolution frame 306 in the reference projector frame buffer 120, as defined in Equation III;
   X=desired high-resolution frame 308; and
   P(X-hat|X)=probability of X-hat given X.

Thus, as indicated by Equation V, the goal of the optimization is to determine the sub-frame values ($Y_{ik}$) that maximize the probability of X-hat given X. Given a desired high-resolution image 308 (X) to be projected, sub-frame generator 108 (FIG. 1) determines the component sub-frames 110 that maximize the probability that the simulated high-resolution image 306 (X-hat) is the same as or matches the "true" high-resolution image 308 (X).

Using Bayes rule, the probability P(X-hat|X) in Equation V can be written as shown in the following Equation VI:

$$P(\hat{X}|X) = \frac{P(X|\hat{X})P(\hat{X})}{P(X)} \quad \text{Equation VI}$$

where:
  X-hat=hypothetical or simulated high-resolution frame 306 in the reference projector frame buffer 120, as defined in Equation III;
  X=desired high-resolution frame 308;
  P(X-hat|X)=probability of X-hat given X;
  P(X|X-hat)=probability of X given X-hat;
  P(X-hat)=prior probability of X-hat; and
  P(X)=prior probability of X.

The term P(X) in Equation VI is a known constant. If X-hat is given, then, referring to Equation IV, X depends only on the noise term, $\eta$, which is Gaussian. Thus, the term P(X|X-hat) in Equation VI will have a Gaussian form as shown in the following Equation VII:

$$P(X|\hat{X}) = \frac{1}{C} e^{-\sum_i \left( \frac{\|X_i - \hat{X}_i\|^2}{2\sigma_i^2} \right)} \quad \text{Equation VII}$$

where:
  X-hat=hypothetical or simulated high-resolution frame 306 in the reference projector frame buffer 120, as defined in Equation III;
  X=desired high-resolution frame 308;
  P(X|X-hat)=probability of X given X-hat;
  C=normalization constant;
  i=index for identifying color planes;
  $X_i$=ith color plane of the desired high-resolution frame 308;
  X-hat$_i$=hypothetical or simulated high-resolution image for the ith color plane in the reference projector frame buffer 120, as defined in Equation II; and
  $\sigma_i$=variance of the noise term, $\eta$, for the ith color plane.

To provide a solution that is robust to minor calibration errors and noise, a "smoothness" requirement is imposed on X-hat. In other words, it is assumed that good simulated images 306 have certain properties. For example, for most good color images, the luminance and chrominance derivatives are related by a certain value. In one embodiment, a smoothness requirement is imposed on the luminance and chrominance of the X-hat image based on a "Hel-Or" color prior model, which is a conventional color model known to those of ordinary skill in the art. The smoothness requirement according to one embodiment is expressed in terms of a desired probability distribution for X-hat given by the following Equation VIII:

$$P(\hat{X}) = \frac{1}{Z(\alpha, \beta)} e^{-\{\alpha^2(\|\nabla \hat{C}_1\|^2 + \|\nabla \hat{C}_2\|^2) + \beta^2(\|\nabla \hat{L}\|^2)\}} \quad \text{Equation VIII}$$

where:
  P(X-hat)=prior probability of X-hat;
  $\alpha$ and $\beta$=smoothing constants;
  Z($\alpha$, $\beta$)=normalization function;
  $\nabla$=gradient operator; and
  C-hat$_1$=first chrominance channel of X-hat;
  C-hat$_2$=second chrominance channel of X-hat; and
  L-hat=luminance of X-hat.

In another embodiment of the invention, the smoothness requirement is based on a prior Laplacian model, and is expressed in terms of a probability distribution for X-hat given by the following Equation IX:

$$P(\hat{X}) = \frac{1}{Z(\alpha, \beta)} e^{-\{\alpha(|\nabla \hat{C}_1| + |\nabla \hat{C}_2|) + \beta(|\nabla \hat{L}|)\}} \quad \text{Equation IX}$$

where:
  P(X-hat)=prior probability of X-hat;
  $\alpha$ and $\beta$=smoothing constants;
  Z($\alpha$, $\beta$)=normalization function;
  $\nabla$=gradient operator; and
  C-hat$_1$=first chrominance channel of X-hat;
  C-hat$_2$=second chrominance channel of X-hat; and
  L-hat=luminance of X-hat.

The following discussion assumes that the probability distribution given in Equation VIII, rather than Equation IX, is being used. As will be understood by persons of ordinary skill in the art, a similar procedure would be followed if Equation IX were used. Inserting the probability distributions from Equations VII and VIII into Equation VI, and inserting the result into Equation V, results in a maximization problem involving the product of two probability distributions (note that the probability P(X) is a known constant and goes away in the calculation). By taking the negative logarithm, the exponents go away, the product of the two probability distributions becomes a sum of two probability distributions, and the maximization problem given in Equation V is transformed into a function minimization problem, as shown in the following Equation X:

$$Y_{ik}^* = \operatorname*{argmax}_{Y_{ik}} \sum_{i=1}^N \|X_i - \hat{X}_i\|^2 + \alpha^2 \left\{ \left\| \nabla \left( \sum_{i=1}^N T_{C_1 i} \hat{X}_i \right) \right\|^2 + \left\| \nabla \left( \sum_{i=1}^N T_{C_2 i} \hat{X}_i \right) \right\|^2 \right\} + \beta^2 \left\| \nabla \left( \sum_{i=1}^N T_{Li} \hat{X}_i \right) \right\|^2 \quad \text{Equation X}$$

where:
  k=index for identifying individual sub-frames 110;
  i=index for identifying color planes;
  $Y_{ik}^*$=optimum low-resolution sub-frame data for the kth sub-frame 110 in the ith color plane;
  $Y_{ik}$=kth low-resolution sub-frame 110 in the ith color plane;
  N=number of color planes;
  $X_i$=ith color plane of the desired high-resolution frame 308;
  X-hat$_i$=hypothetical or simulated high-resolution image for the ith color plane in the reference projector frame buffer 120, as defined in Equation II;
  $\alpha$ and $\beta$=smoothing constants;
  $\nabla$=gradient operator;
  $T_{C_1 i}$=ith element in the second row in a color transformation matrix, T, for transforming the first chrominance channel of X-hat;
  $T_{C_2 i}$=ith element in the third row in a color transformation matrix, T, for transforming the second chrominance channel of X-hat; and $T_{Li}$=ith element in the first row in a color transformation matrix, T, for transforming the luminance of X-hat.

The function minimization problem given in Equation X is solved by substituting the definition of X-hat$_i$ from Equation II into Equation X and taking the derivative with respect to $Y_{ik}$, which results in an iterative algorithm given by the following Equation XI:

$$Y_{ik}^{(n+1)} = Y_{ik}^{(n)} - \Theta \left\{ D_i F_{ik}^T H_i^T \left[ (\hat{X}_i^{(n)} - X_i) + (\hat{X}_i^{(n)} - X_i) + \alpha^2 \nabla^2 \begin{pmatrix} T_{C_1 i} \sum_{j=1}^N T_{C_1 j} \hat{X}_j^{(n)} + \\ T_{C_2 i} \sum_{j=1}^N T_{C_2 j} \hat{X}_j^{(n)} \end{pmatrix} \dots + \beta^2 \nabla^2 T_{Li} \sum_{j=1}^N T_{Lj} \hat{X}_j^{(n)} \right] \right\}$$

Equation XI where:

k=index for identifying individual sub-frames 110;

i and j=indices for identifying color planes;

n=index for identifying iterations;

$Y_{ik}^{(n+1)}$=kth low-resolution sub-frame 110 in the ith color plane for iteration number n+1;

$Y_{ik}^{(n)}$=kth low-resolution sub-frame 110 in the ith color plane for iteration number n;

$\Theta$=momentum parameter indicating the fraction of error to be incorporated at each iteration;

$D_i$=down-sampling matrix for the ith color plane;

$H_i^T$=Transpose of interpolating filter, $H_i$, from Equation I (in the image domain, $H_i^T$ is a flipped version of $H_i$);

$F_{ik}^T$=Transpose of operator, $F_{ik}$, from Equation II (in the image domain, $F_{ik}^T$ is the inverse of the warp denoted by $F_{ik}$);

X-hat$_i^{(n)}$=hypothetical or simulated high-resolution image for the ith color plane in the reference projector frame buffer 120, as defined in Equation II, for iteration number n;

$X_i$=ith color plane of the desired high-resolution frame 308;

α and β=smoothing constants;

$\nabla^2$=Laplacian operator;

$T_{C1i}$=ith element in the second row in a color transformation matrix, T, for transforming the first chrominance channel of X-hat;

$T_{C2i}$=ith element in the third row in a color transformation matrix, T, for transforming the second chrominance channel of X-hat;

$T_{Li}$=ith element in the first row in a color transformation matrix, T, for transforming the luminance of X-hat;

X-hat$_j^{(n)}$=hypothetical or simulated high-resolution image for the jth color plane in the reference projector frame buffer 120, as defined in Equation II, for iteration number n;

$T_{C1j}$=jth element in the second row in a color transformation matrix, T, for transforming the first chrominance channel of X-hat;

$T_{C2j}$=jth element in the third row in a color transformation matrix, T, for transforming the second chrominance channel of X-hat;

$T_{Lj}$=jth element in the first row in a color transformation matrix, T, for transforming the luminance of X-hat; and N=number of color planes.

Equation XI may be intuitively understood as an iterative process of computing an error in the reference projector 118 coordinate system and projecting it back onto the sub-frame data. In one embodiment, sub-frame generator 108 (FIG. 1) is configured to generate sub-frames 110 in real-time using Equation XI. The generated sub-frames 110 are optimal in one embodiment because they maximize the probability that the simulated high-resolution image 306 (X-hat) is the same as the desired high-resolution image 308 (X), and they minimize the error between the simulated high-resolution image 306 and the desired high-resolution image 308. Equation XI can be implemented very efficiently with conventional image processing operations (e.g., transformations, down-sampling, and filtering). The iterative algorithm given by Equation XI converges rapidly in a few iterations and is very efficient in terms of memory and computation (e.g., a single iteration uses two rows in memory; and multiple iterations may also be rolled into a single step). The iterative algorithm given by Equation XI is suitable for real-time implementation, and may be used to generate optimal sub-frames 110 at video rates, for example.

To begin the iterative algorithm defined in Equation XI, an initial guess, $Y_{ik}^{(0)}$, for the sub-frames 110 is determined. In one embodiment, the initial guess for the sub-frames 110 is determined by texture mapping the desired high-resolution frame 308 onto the sub-frames 110. In one form of the invention, the initial guess is determined from the following Equation XII:

$$Y_{ik}^{(0)} = D_i B_i F_{ik}^T X_i \qquad \text{Equation XII}$$

where:

k=index for identifying individual sub-frames 110;

i=index for identifying color planes;

$Y_{ik}^{(0)}$=initial guess at the sub-frame data for the kth sub-frame 110 for the ith color plane;

$D_i$=down-sampling matrix for the ith color plane;

$B_i$=interpolation filter for the ith color plane;

$F_{ik}^T$=Transpose of operator, $F_{ik}$, from Equation II (in the image domain, $F_{ik}^T$ is the inverse of the warp denoted by $F_{ik}$); and $X_i$=ith color plane of the desired high-resolution frame 308.

Thus, as indicated by Equation XII, the initial guess ($Y_{ik}^{(0)}$) is determined by performing a geometric transformation ($F_{ik}^T$) on the ith color plane of the desired high-resolution frame 308 ($X_i$), and filtering ($B_i$) and down-sampling ($D_i$) the result. The particular combination of neighboring pixels from the desired high-resolution frame 308 that are used in generating the initial guess ($Y_{ik}^{(0)}$) will depend on the selected filter kernel for the interpolation filter ($B_i$).

In another form of the invention, the initial guess, $Y_{ik}^{(0)}$, for the sub-frames 110 is determined from the following Equation XIII:

$$Y_{ik}^{(0)} = D_i F_{ik}^T X_i \qquad \text{Equation XIII}$$

where:

k=index for identifying individual sub-frames 110;

i=index for identifying color planes;

$Y_{ik}^{(0)}$=initial guess at the sub-frame data for the kth sub-frame 110 for the ith color plane;

$D_i$=down-sampling matrix for the ith color plane;

$F_{ik}^T$=Transpose of operator, $F_{ik}$, from Equation II (in the image domain, $F_{ik}^T$ is the inverse of the warp denoted by $F_{ik}$); and $X_i$=ith color plane of the desired high-resolution frame 308.

Equation XIII is the same as Equation XII, except that the interpolation filter ($B_k$) is not used.

Several techniques are available to determine the geometric mapping ($F_{ik}$) between each projector 112 and the reference projector 118, including manually establishing the mappings, or using camera 122 and calibration unit 124 (FIG. 1) to automatically determine the mappings. In one embodiment, if camera 122 and calibration unit 124 are used, the geometric mappings between each projector 112 and the camera 122 are determined by calibration unit 124. These projector-to-camera mappings may be denoted by $T_k$, where k is an index for identifying projectors 112. Based on the projector-to-camera mappings ($T_k$), the geometric mappings ($F_k$) between each projector 112 and the reference projector 118 are determined by calibration unit 124, and provided to sub-frame generator 108. For example, in a display system 100 with two projectors 112A and 112B, assuming the first projector 112A is the reference projector 118, the geometric mapping of the second projector 112B to the first (reference) projector 112A can be determined as shown in the following Equation XIV:

$$F_2 = T_2 T_1^{-1} \quad \text{Equation XIV}$$

where:

$F_2$=operator that maps a low-resolution sub-frame 110 of the second projector 112B to the first (reference) projector 112A;

$T_1$=geometric mapping between the first projector 112A and the camera 122; and $T_2$=geometric mapping between the second projector 112B and the camera 122.

In one embodiment, the geometric mappings ($F_{ik}$) are determined once by calibration unit 124, and provided to sub-frame generator 108. In another embodiment, calibration unit 124 continually determines (e.g., once per frame 106) the geometric mappings ($F_{ik}$), and continually provides updated values for the mappings to sub-frame generator 108.

Figure 4:
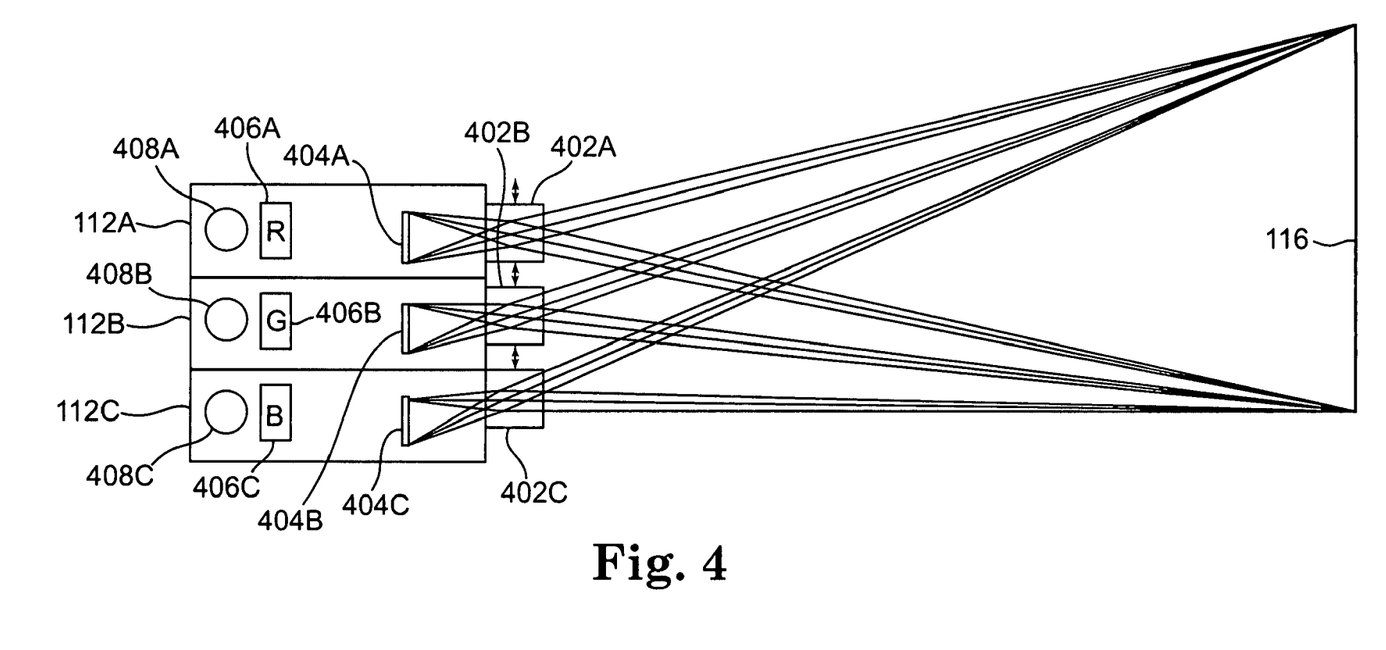
FIG. 4 is a diagram illustrating a projector configuration and a method for adjusting the position of displayed sub-frames on the target surface according to one embodiment of the present invention.

FIG. 4 is a diagram illustrating a projector configuration and a method for adjusting the position of displayed sub-frames 110 on target surface 116 according to one embodiment of the present invention. In the embodiment illustrated in FIG. 4, projectors 112A-112C are stacked on top of each other, and project red, green, and blue sub-frames 110, respectively, onto target surface 116. Projector 112A includes projection lens 402A, light valves 404A, light filter 406A, and light source 408A. Projector 112B includes projection lens 402B, light valves 404B, light filter 406B, and light source 408B. Projector 112C includes projection lens 402C, light valves 404C, light filter 406C, and light source 408C. Light filters 406A-406C (collectively referred to as light filters 406) filter the light output by light sources 408A-408C (collectively referred to as light sources 408), respectively. The filtered light is provided to light valves 404A-404C, which direct the light to projection lenses 402A-402C, respectively. Projection lenses 402A-402C project the received light onto target surface 116. The light from each of the projectors 112 follows a different light path to the target surface 116.

In one embodiment, the position of displayed sub-frames 110 on target surface 116 for each projector 112A-112C is adjusted to a desired position by adjusting the transverse position of the projection lenses 402A-402C of the projectors 112A-112C relative to the light valves 404A-404C of the projectors 112A-112C (as indicated by the arrows in FIG. 4), which causes a translation of the sub-frames 110 on the target surface 116. In one form of the invention, the light source optics (not shown) of projectors 112 are also adjusted to maintain uniform screen illumination.

In one form of the present invention, each projector 112A-112C is configured to project a single color of light. In contrast, conventional projectors typically use a single light source and red, green, and blue light filters to produce multi-color images. Many ultra-high pressure (UHP) light sources, such as Metal-Halide lamps and Mercury arc lamps, provide broad spectrum coverage, but have a "peaky response".

Figure 5:
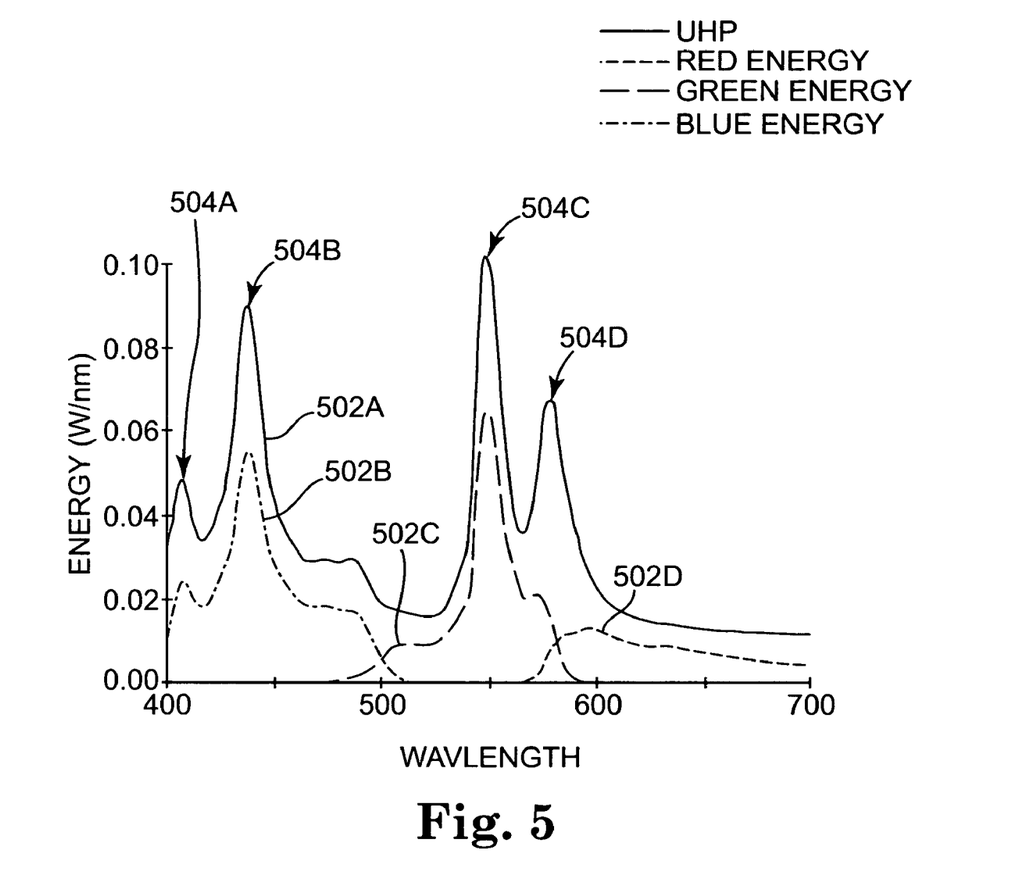
FIG. 5 is a diagram illustrating the spectral distribution of a conventional ultra-high pressure (UHP) light source.

FIG. 5 is a diagram illustrating the spectral distribution of a typical ultra-high pressure (UHP) light source. The horizontal axis in FIG. 5 represents wavelength, and the vertical axis represents energy. There are four curves 502A-502D shown in FIG. 5. Curve 502A represents the spectral distribution of the UHP source. As can be seen by curve 502A, the spectral distribution for the UHP source covers a broad spectrum, and includes four peaks 504A-504D. Peak 504A occurs at a wavelength of just over 400 nanometers. Peak 504B occurs at a wavelength of between about 425 and 450 nanometers. Peak 504C occurs at a wavelength of about 550 nanometers. Peak 504D occurs at a wavelength of just over 575 nanometers. Peak 504B occurs in a range that corresponds to the color blue. Peak 504C occurs in a range that corresponds to the color green. Peak 504D occurs in a range that corresponds to the color yellow.

Curve 502B in FIG. 5 represents the spectral distribution of the UHP light source after being filtered by a blue color filter. Curve 502C represents the spectral distribution of the UHP light source after being filtered by a green color filter. Curve 502D represents the spectral distribution of the UHP light source after being filtered by a red color filter. As can be seen by these curves 502A-502D, a typical UHP light source has many peaks and valleys, and is deficient in red wavelengths. Thus, when used with a color wheel for example, the red filter on the color wheel is typically made larger than the green and blue filters to capture more red light. The naturally occurring yellow spike 504D is typically attenuated by the RGB filters in conventional projectors since it falls between red and green.

In one form of the present invention, each of the light sources 408A-408C is tuned to project a particular color, and the corresponding color filters 406A-406C for the light sources 408A-408C are designed to match the particular color being projected. The light sources 408A-408C may be deficient in areas of the spectrum other than the particular color they are tuned to project, but this is not a problem, because in the multi-projector overlapped display according to one form of the invention, with each projector 112 projecting a different color, the overall system still covers the spectrum broadly. Xenon lamps have a nearly flat spectrum and provide more energy at red wavelengths than many other light sources, but are typically expensive. In one form of the invention, light source 408A includes one or more Xenon lamps for providing red light, and light sources 408B and 408C are less expensive lamps, such as UHP lamps, for providing green and blue light, respectively.

In one form of the invention, light sources 408A-408C have substantially different spectral distributions (e.g., greater spectral differences than the minor variations that may occur between two light sources of the same type). In one embodiment, light source 408A provides more energy at wavelengths corresponding to the color red than light sources 408B and 408C, light source 408B provides more energy at wavelengths corresponding to the color green than light sources 408A and 408C, and light source 408C provides more energy at wavelengths corresponding to the color blue than light sources 408A and 408B. Thus, each projector 112 is configured to provide more energy for a particular color than the other projectors 112 in the system 100. In this embodiment, filter 406A is a red filter for passing red light and blocking other light, filter 406B is a green filter for passing green light and blocking other light, and filter 406C is a blue filter for passing blue light and blocking other light. The red, green, and blue color filters 406 are designed to take advantage of the natural spectral peak of the light sources 408. In one form of the invention, the response of the target surface 116 is also taken into account in the design of the color filters 406.

In one form of the invention, light sources 408A-408C are each a different type of light source. In one embodiment, light source 408A includes one or more red light emitting diodes (LED's), one or more red lasers, or one or more Tungsten light sources (note that Tungsten sources have more power in red than in other visible regions of the spectrum). In one embodiment, light source 408B includes one or more green LED's or green lasers, and light source 408C includes one or more blue LED's or blue lasers.

In another embodiment, light sources 408A-408C are each the same type of light source, and different spectral characteristics for the light sources 408A-408C are achieved by operating the light sources 408A-408C at different temperatures. In one form of this embodiment, the light sources 408A-408C are each a lamp with a dominant green spectrum at a normal operating temperature. One of the light sources 408B is operated at the normal operating temperature and uses a green color filter 406B. A second one of the light sources 408A is operated at a temperature below the normal operating temperature to shift the dominant green spectrum toward red, and uses a red color filter 406A. A third one of the light sources 408C is operated at a temperature above the normal operating temperature to shift the dominant green spectrum toward blue, and uses a blue color filter 406C.

In one form of the invention, at least one of the light sources 408 has a naturally occurring peak or spike that falls outside of the red, green, and blue regions in the spectral distribution, such as the yellow spike 504D shown in FIG. 5, and the color filter 406 for this light source 408 is tuned to the wavelength of this peak. In this manner, primary colors other than, or in addition to, red, green, and blue, may be generated. In one embodiment, system 100 includes at least four projectors 112, with at least one projector 112 tuned to project red light, at least one projector 112 tuned to project green light, at least one projector 112 tuned to project blue light, and at least one projector 112 tuned to project another color of light, such as yellow. By using a yellow filter 406 in addition to red, green, and blue filters 406, the energy at yellow wavelengths is captured without diluting the green or red colorants. Yellow light is typically good for reproducing skin tones, for example.

In one embodiment, projectors 112 use light sources 408 with individually designed spectral characteristics. One form of the present invention optimizes color performance of the multi-projector overlapped projection system 100 by matching individually designed light source 408 and color filter 406 pairs for each component projector 112 in the system 100. By using multiple individually designed light source 408 and color filter 406 combinations, system 100 can achieve efficient spectrum utilization, low cost, and a wide gamut. Using an individual color filter 406 for each projector 112 according to one form of the invention provides a hyper-spectral or high-fidelity color projection system 100 with more than three primary colors.

One form of the present invention is an image display system 100 that provides high-brightness, high-resolution, high-efficiency, and a wide color gamut by aligned, overlapped projection of different low-resolution single-color sub-frames 110. One form of the invention achieves significantly better color fidelity, gamut, and efficiency by using jointly designed light source 408 and color filter 406 pairs, compared to single lamp 3-color systems, or single lamp multi-primary sequential color systems.

One form of the present invention provides an image display system 100 with multiple overlapped low-resolution projectors 112 coupled with an efficient real-time (e.g., video rates) image processing algorithm for generating sub-frames 110. In one embodiment, multiple low-resolution, low-cost projectors 112 are used to produce high resolution images 114 at high lumen levels, but at lower cost than existing high-resolution projection systems, such as a single, high-resolution, high-output projector. One form of the present invention provides a scalable image display system 100 that can provide virtually any desired resolution, brightness, and color, by adding any desired number of component projectors 112 to the system 100.

In some existing display systems, multiple low-resolution images are displayed with temporal and sub-pixel spatial offsets to enhance resolution. There are some important differences between these existing systems and embodiments of the present invention. For example, in one embodiment of the present invention, there is no need for circuitry to offset the projected sub-frames 110 temporally. In one form of the invention, the sub-frames 110 from the component projectors 112 are projected "in-sync". As another example, unlike some existing systems where all of the sub-frames go through the same optics and the shifts between sub-frames are all simple translational shifts, in one form of the present invention, the sub-frames 110 are projected through the different optics of the multiple individual projectors 112. In one form of the invention, the signal processing model that is used to generate optimal sub-frames 110 takes into account relative geometric distortion among the component sub-frames 110, and is robust to minor calibration errors and noise.

It can be difficult to accurately align projectors into a desired configuration. In one embodiment of the invention, regardless of what the particular projector configuration is, even if it is not an optimal alignment, sub-frame generator 108 determines and generates optimal sub-frames 110 for that particular configuration.

Algorithms that seek to enhance resolution by offsetting multiple projection elements have been previously proposed. These methods assume simple shift offsets between projectors, use frequency domain analyses, and rely on heuristic methods to compute component sub-frames. In contrast, one form of the present invention utilizes an optimal real-time sub-frame generation algorithm that explicitly accounts for arbitrary relative geometric distortion (not limited to homographies) between the component projectors 112, including distortions that occur due to a target surface 116 that is non-planar or has surface non-uniformities. One form of the present invention generates sub-frames 110 based on a geometric relationship between a hypothetical high-resolution reference projector 118 at any arbitrary location and each of the actual low-resolution projectors 112, which may also be positioned at any arbitrary location.

One form of the present invention provides a system 100 with multiple overlapped low-resolution projectors 112, with each projector 112 projecting a different colorant to compose a full color high-resolution image 114 on the screen 116 with minimal color artifacts due to the overlapped projection. By imposing a color-prior model via a Bayesian approach as is done in one embodiment of the invention, the generated solution for determining sub-frame values minimizes color aliasing artifacts and is robust to small modeling errors.

Using multiple off the shelf projectors 112 in system 100 allows for high resolution. However, if the projectors 112 include a color wheel, which is common in existing projectors, the system 100 may suffer from light loss, sequential color artifacts, poor color fidelity, reduced bit-depth, and a significant tradeoff in bit depth to add new colors. One form of the present invention eliminates the need for a color wheel, and uses in its place, a different color filter 406 for each projector 112. Thus, in one embodiment, projectors 112 each project different single-color images. By not using a color wheel, segment loss at the color wheel is eliminated, which could be up to a 20% loss in efficiency in single chip projectors. One embodiment of the invention increases perceived resolution, eliminates sequential color artifacts, improves color fidelity since no spatial or temporal dither is required, provides a high bit-depth per color, and allows for high-fidelity color.

Image display system 100 is also very efficient from a processing perspective since, in one embodiment, each projector 112 only processes one color plane. Thus, each projector 112 reads and renders only one-third (for RGB) of the full color data.

In one embodiment, image display system 100 is configured to project images 114 that have a three-dimensional (3D) appearance. In 3D image display systems, two images, each with a different polarization, are simultaneously projected by two different projectors. One image corresponds to the left eye, and the other image corresponds to the right eye. Conventional 3D image display systems typically suffer from a lack of brightness. In contrast, with one embodiment of the present invention, a first plurality of the projectors 112 may be used to produce any desired brightness for the first image (e.g., left eye image), and a second plurality of the projectors 112 may be used to produce any desired brightness for the second image (e.g., right eye image). In another embodiment, image display system 100 may be combined or used with other display systems or display techniques, such as tiled displays. For example, for a displayed image 114 with a plurality of tiles, each tile in the displayed image 114 could be produced by a different plurality of overlapping projectors 112, such as a first set of three projectors 112 for producing overlapping sub-frames for a first tile, a second set of three projectors 112 for producing overlapping sub-frames for a second tile, and so on.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of displaying an image with a display system, the method comprising:
receiving image data for the image;
generating a first sub-frame, a second sub-frame, and a third sub-frame corresponding to the image data;
projecting the first sub-frame onto a target surface using a first projector light source;
projecting the second sub-frame onto the target surface using a second projector light source; and
projecting, the third sub-frame onto the target surface using a third projector light source, wherein the first, the second, and the third sub-frames at least partially overlap on the target surface, and wherein the first, the second, and the third light sources have substantially different spectral distributions and are each in separate and distinct projector devices.

2. The method of claim 1, wherein the first and second light sources are different types of light sources.

3. The method of claim 1, wherein the first and second light sources are a same type of light source, and wherein the substantially different spectral distributions are generated by operating the first and second light sources at different temperatures, thereby shifting the spectral distribution of at least one of the first and the second light sources.

4. The method of claim 1, and further comprising:
providing a first color filter associated with the first light source and configured to pass a first color of light from the first light source and block other colors of light from the first light source; and
providing a second color filter associated with the second light source and configured to pass a second color of light from the second light source and block other colors of light from the second light source.

5. The method of claim 4, wherein the first light source is configured to provide more energy for the first color of light than the second light source, and wherein the second light source is configured provide more energy for the second color of light than the first light source.

6. The method of claim 1, wherein the first light source is configured to provide more energy for red light than the second and third light sources, the second light source is configured to provide more energy for green light than the first and third light sources, and the third light source is configured to provide more energy for blue light than the first and second light sources.

7. The method of claim 6, wherein the first light source is one of red LED, red laser, tungsten light source, or Xenon lamp.

8. The method of claim 6, wherein the second light source is one of a green LED or green laser.

9. The method of claim 6, wherein the third light source is one or a blue LED or blue laser.

10. The method of claim 1, and further comprising:
generating a fourth sub-frame corresponding to the image data;
projecting the fourth sub-frame onto the target surface using a fourth projector light source; and
wherein the first, the second, the third, and the fourth sub-frames at least partially overlap on the target surface, and wherein the first, the second, the third, and the fourth light sources have substantially different spectral distributions.

11. The method of claim 1, wherein the first and the second sub-frames are generated based on maximization of a probability that a simulated image is the same as the image data.

12. A system for displaying an image, the system comprising:
a buffer adapted to receive image data for the image;
a sub-frame generator configured to define first, second, and third sub-frames corresponding to the image data;
a first projection device adapted to project the first sub-frame onto a target surface using a first projection lens and a first light source;
a second projection device separate and distinct from the first projection device adapted to project the second sub-frame onto the target surface using a second projection lens and a second light source with substantially different spectral characteristics than the first light source, wherein the second sub-frame at least partially overlaps the first sub-frame; and a third projection device separate and distinct from the first and second projection devices adapted to project the third sub-frame onto the target surface using a third projection lens and a third light source with substantially different spectral characteristics than the first and second light sources.

13. The system of claim 12, wherein the first and second light sources are different types of light sources.

14. The system of claim 12, wherein the first and second light sources are a same type of light source, and wherein the substantially different spectral characteristics are provided by operating the first and second light sources at different temperatures, thereby shifting the spectral characteristics of at least one of the first and the second light sources.

15. The system of claim 12, and further comprising:
a first color filter associated with the first light source and configured to pass a first color of light from the first light source and block other colors of light from the first light source; and
a second color filter associated with the second light source and configured to pass a second color of light from the second light source and block other colors of light from the second light source.

16. The system of claim 15, wherein the first light source is configured to provide more energy for the first color of light than the second light source, and wherein the second light source is configured to provide more energy for the second color of light than the first light source.

17. The system of claim 12, wherein the first light source is configured to provide more energy for red light than the second and third light sources, the second light source is configured to provide more energy for green light than the first and third light sources, and the third light source is configured to provide more energy for blue light than the first and second light sources.

18. The system of claim 17, wherein the first light source is one of a red LED, red laser, tungsten light source, or Xenon lamp.

19. The system of claim 17, wherein the second light source is one of a green LED or green laser.

20. The system of claim 17, wherein the third light source is one of a blue LED or blue laser.

21. The system of claim 12, wherein the sub-frame generator is configured to define a fourth sub-frame corresponding to the image data, the system further comprising:
a fourth projection device adapted to project the fourth sub-frame onto a target surface using fourth light source with substantially different spectral characteristics than the first, second, and third light sources.

22. The system of claim 12, wherein the first and the second sub-frames are defined based on maximization of a probability that a hypothetical image matches the image data.

23. A system for projecting low-resolution sub-frames onto a viewing surface at spatially offset positions to generate the appearance of a high-resolution image, the system comprising:
means for receiving a first high-resolution image;
means for generating a first plurality of low-resolution sub-frames based on the first high-resolution image;
first means for generating a first color of light for projecting a first one of the sub-frames using a first projection lens;
second means for generating a second color of light for projecting a second one of the sub-frames using a second projection lens;
third means for generating a third color of light for projecting a third one of the sub-frames using a third projection lens; and
wherein the first means generates more energy for the first color of light than the second means is capable of generating, and the second means generates more energy for the second color of light than the first means is capable of generating, and wherein the third means generates more energy for the third color of light than the first and second means are capable of generating.

24. The system of claim 23, wherein the first means is configured to provide more energy for red light than the second and third means are capable of providing, the second means is configured to provide more energy for green light than the first and third means are capable of providing, and the third means is configured to provide more energy for blue light than the first and second means are capable of providing.

25. The system of claim 23, and further comprising:
fourth means for generating a fourth color of light for projecting a fourth one of the sub-frames; and
wherein the fourth means generates more energy for the fourth color of light than the first, second, and third means are capable of generating.

26. The system of claim 23, wherein the sub-frames are generated based on a difference between the first high-resolution image and a simulated high-resolution image.

27. A method of displaying an image with a display system, the method comprising:
receiving image data for the image;
generating a first sub-frame and a second sub-frame corresponding to the image data;
projecting the first sub-frame onto a target surface using a first projector light source; and
projecting the second sub-frame onto the target surface using a second projector light source, wherein the first and the second sub-frames at least partially overlap on the target surface, and wherein the first and the second light sources have substantially different spectral distributions, and wherein the first and second light sources are a same type of light source, and wherein the substantially different spectral distributions are generated by operating the first and second light sources at different temperatures, thereby shifting the spectral distribution of at least one of the first and the second light sources.

28. A system for displaying an image, the system comprising:
a buffer adapted to receive image data for the image;
a sub-frame generator configured to define first and second sub-frames corresponding to the image data;
a first projection device adapted to project the first sub-frame onto a target surface using a first light source; and
a second projection device adapted to project the second sub-frame onto the target surface using a second light source with substantially different spectral characteristics than the first light source, wherein the second sub-frame at least partially overlaps the first sub-frame, and wherein the first and second light sources are a same type of light source, and wherein the substantially different spectral characteristics are provided by operating the first and second light sources at different temperatures, thereby shifting the spectral characteristics of at least one of the first and the second light sources.

* * * * *

UNITED STATES PATENT AND TRADEMARK OFFICE
CERTIFICATE OF CORRECTION

PATENT NO.         : 7,407,295 B2                                    Page 1 of 1
APPLICATION NO.    : 11/189596
DATED              : August 5, 2008
INVENTOR(S)        : Niranjan Damera-Venkata et al.

It is certified that error appears in the above-identified patent and that said Letters Patent is hereby corrected as shown below:

In column 11, line 12, after " $(\tilde{x}_i^{(n)} - x_i)+$ " delete " $(\tilde{x}_i^{(n)} - x_i)+$ ".

In column 18, line 28, in Claim 5, after "configured" insert -- to --.

In column 19, line 52, in Claim 21, after "using" insert -- a --.

Signed and Sealed this

Twenty-fourth Day of February, 2009

JOHN DOLL
*Acting Director of the United States Patent and Trademark Office*